Patented Aug. 1, 1950

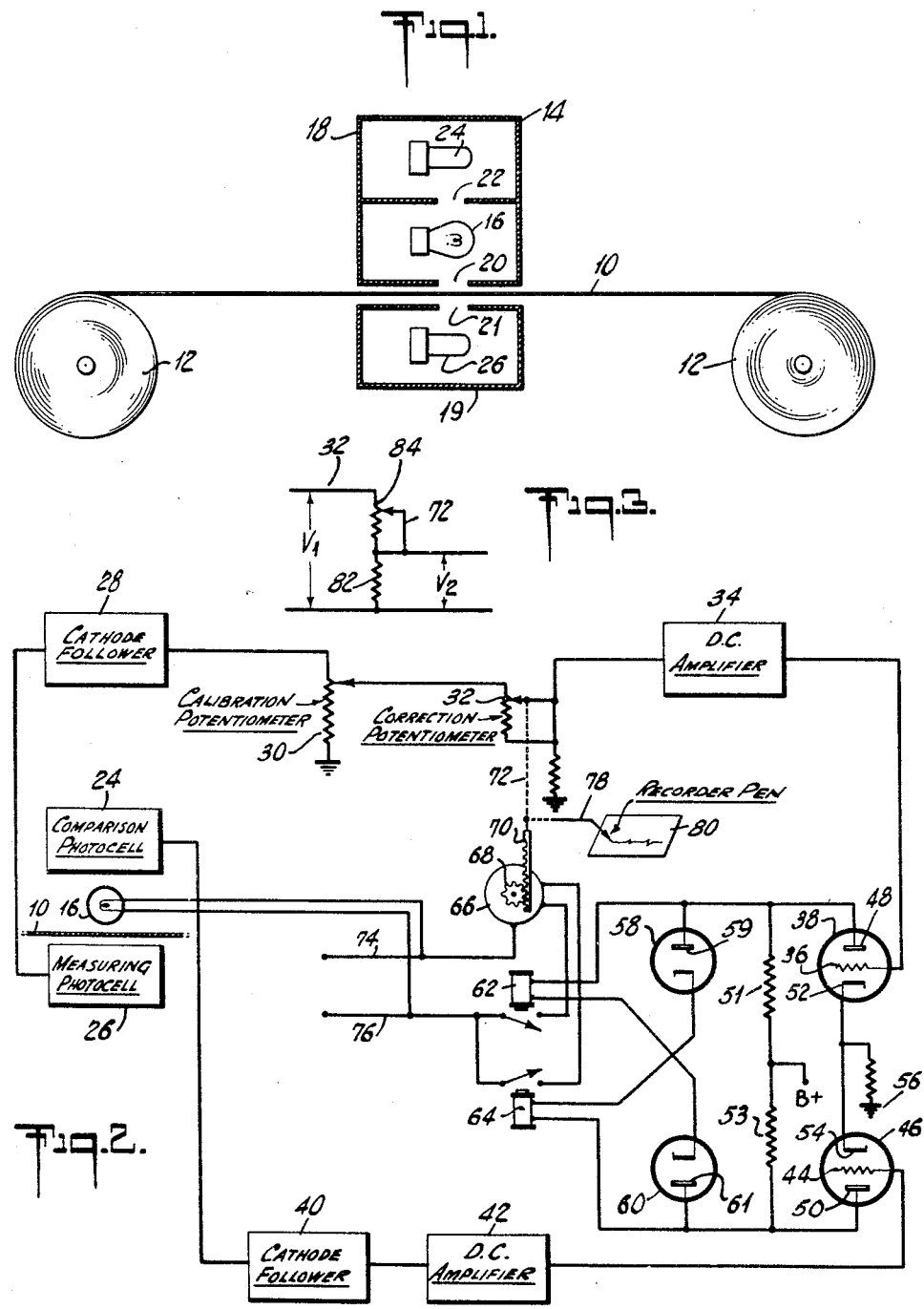

2,517,330

UNITED STATES PATENT OFFICE 2,517,330

APPARATUS FOR MEASURING THE THICKNESS OF SEMIOPAQUE MATERIAL

Pete E. Marenholtz, Somerville, N. J., assignor to Johns-Manville Corporation, New York, N. Y., a corporation of New York Application September 7, 1949, Serial No. 114,408

3 Claims. (Cl. 346—33)

This invention relates to a method and apparatus for continually measuring the thickness of a sheet of paper or other material which is semi-opaque to visible light and of substantially homogeneous composition. A principal object of the invention is the provision of a method and apparatus for automatically making a continuous permanent record of the thickness of successive portions of the material under examination.

It will be recognized that the visible light transmitting ability of a substantially homogeneous translucent material is a function of the thickness of that material. Any increase in thickness of a portion of the material over that of another portion is accompanied by a substantially proportionate increment in opacity. A further object of the invention is to utilize this relationship between the thickness and the opacity of a material, particularly a sheet material, to continually measure and record its thickness at successive points.

A further object of the invention is the provision of a method and apparatus of the type referred to which will be simple and inexpensive and which will not contact, mark or otherwise alter the sheet being measured.

A special feature embodied in the invention resides in the provision of means whereby the record made by the recording instrument bears a substantially linear relationship to variations in thickness of successive areas of the material measured.

An object of the invention is the provision of a method and apparatus adapted to accurately measure relatively thin sheets of material, for example, paper having a thickness of .0015–.0080", such sheets being incapable of accurate measurement by calipers or beta-ray thickness testers.

With these objects in view, the invention resides in a device having means to measure and record fluctuations in light reaching a photosensitive cell after being directed through material which is interposed between the source of light and a photosensitive surface positioned to receive the light rays.

Briefly, the method comprises effecting relative movement between the material to be measured and an optical system which includes a photosensitive cell which is energized by visible light transmitted through successive portions of the material, and a second photosensitive cell energized by light directly transmitted from the same light source, measuring voltage changes in an electrical circuit in which the voltages developed by the two photocells are compared, the voltage changes being induced by variation in light transmitted through the material due to changes in material thickness, and mechanically recording the direction and magnitude of such changes.

The invention will be more fully understood when reference is made to the following detailed description and accompanying drawings in which Fig. 1 is a diagrammatic sectional view of a system embodying the invention;

Fig. 2 is a diagram of the circuit employed in the system of Fig. 1; and

Fig. 3 is a diagram of the correction potentiometer circuit employed in Fig. 2.

Referring particularly to the drawing, a length of the material to be measured, such as paper, indicated at 10, is mounted on reel 12 and driven past the optical system indicated generally at 14. Optical system 14 comprises a source of visible light 16, suitably a standard incandescent bulb mounted in a housing 18. The housing has a lower aperture 20 between the paper and the bulb and an upper aperture 22, above the bulb. A comparison photocell 24 is mounted in light-tight housing 18, the comparison photocell being above aperture 22 whereby it is positioned to receive a portion of the light energy from bulb 16. A suitable light filter (not shown) may be placed within aperture 22 to confine the intensity of the beam incident on the light-sensitive surface of the comparison photocell within the operative range of that cell and the circuit to be described. The beam intensity may be regulated by any suitable or conventional means. However, the method requires that during the operation of the apparatus, the light rays reaching the comparison photocell 24 be transmitted through a medium of substantially unvarying light transmittance so that the amount of light energy reaching photocell 24 is constant during the operation of the testing device provided that the intensity of light source is constant. In the drawing an air space is shown but other media such as a lens, frosted glass, etc. may be used.

A measuring photocell 26 is mounted in a housing 19 below the paper 10 and is substantially in line with bulb 16. The housing is light-tight except for an aperture 21 in its upper wall opposite aperture 20 in the lower wall of housing 18 whereby measuring cell 26 is in position to receive a concentrated beam of light transmitted through the portion of the sheet lying between apertures 20 and 21. Photocells 24 and 26 may take a variety of forms including evacuated, gas-filled and Barrier layer types without departing from the spirit of the invention. Preferably they are relatively rugged evacuated bulbs, the output of such cells having a substantially linear relationship to the intensity of the light rays energizing them. Bulb 16, as previously mentioned, may be any standard incandescent bulb of suitable wattage to provide the desired light intensity. The reel 12, supporting the paper 10, is adapted to be driven by suitable means (not shown) to carry successive areas of the sheet between apertures 20 and 21.

Referring now particularly to Fig. 2, the circuits and attendant structure will be described. Measuring photocell 26 is in a circuit including a cathode follower 28, a calibration potentiometer 30, a correction potentiometer 32, and a D. C. amplifier 34. The output voltage of this circuit is applied to grid 36 of triode 38. Comparison photocell 24 is in a circuit including a cathode follower 40 and D. C. amplifier 42, the output voltage of this circuit being applied to grid 44 of a second triode tube 46. Each amplifier 34 and 42 suitably consists of a vacuum tube, preferably a pentode, connected in conventional manner for D. C. amplification purposes. The particular choice of D. C. amplifier is not critical to the instant invention. Cathode followers 28 and 40, each suitably comprises a vacuum tube suitably connected to lower the circuit impedance while substantially maintaining the photocell output voltage, this facilitating the use of conventional elements in the correction potentiometer circuit. Since the measuring photocell voltage is controlled by the magnitude of the load resistance it is feasible to replace the calibration potentiometer 30 with a variable load resistance across which the measuring photocell voltage is developed.

Correction potentiometer 32 consists of a variable resistance 84 (see Fig. 3) connected in series with a fixed resistance 82. The input voltage $V_1$ is applied across the entire circuit and the output voltage $V_2$ is produced across the fixed resistance 82.

Similar triode tubes 38 and 46, previously referred to, form part of the circuit which balances the voltage applied to the two D. C. amplifiers 34 and 42. It will be understood that other grid-controlled elements may be employed within the scope of the invention. Plates 48 and 50 of triodes 38 and 46, respectively, are connected to a common D. C. power supply indicated at B+ through resistances 51 and 53, respectively. Resistances 51 and 53 are preferably of equal magnitude and of low resistance value compared with the resistance of the relay coils. Cathodes 52 and 54 of triodes 38 and 46, respectively, are commonly grounded through resistance 56. The grid circuits of the triodes 38 and 46 are independent, however, the amplified voltage output of measuring photocell 26 being applied to grid 36 of triode 38 and the amplified voltage of comparison photocell 24 being applied simultaneously to grid 44 of triode 46.

The balancing circuit further includes uni-directional elements, illustrated in the preferred embodiment of the invention as diodes 58 and 60, which serve as relay selection means. Other uni-directional elements such as selenium rectifiers may be used in lieu of the diodes. Diodes 58 and 60 are connected in opposing polarity. Each of the circuits comprising one diode, 58 or 60, and a series relay coil 62 and 64 respectively, adapted to control the operation of sensitive relay contacts, forms an electrical path between the plates of the two triodes 38 and 46. It is evident that the selection of the relay to be energized is governed by the relative potentials on the plates of triodes 38 and 46. Plate 59 of diode 58 is connected to plate 48 of triode 38 and plate 61 of diode 60 is connected to plate 50 of triode 46.

A reversing motor, such as series-wound motor 66, is provided to adjust the correction potentiometer 32. For this purpose it is provided with suitable means such as a pinion mounted on the motor shaft either directly or through a reduction gear, as is desired, the pinion meshing with a rack 70 which carries potentiometer slider 72 controlling the adjustment of the correction potentiometer 32. The power lines of the motor include the line 74 connected directly to the motor and the second line 76 connected to one or the other of the reversing terminals of the motor through the contacts of relays 62 and 64. The particular type of motor forms no part of the instant invention; for example, in lieu of that shown two induction motors on a common shaft may be used, each motor being connected to only one set of relay contacts.

A recorder pen 78 linked to slider 72, contacts a chart 80 which is mounted for travel beneath the recorder pen in any suitable or conventional manner.

In the operation of the apparatus described above, a calibrating sheet which may be a section of paper of known or standard thickness is inserted between apertures 20 and 21. Power is applied to bulb 16 and the complete system. Photocells 24 and 26 are energized by light originating from bulb 16 and the resultant voltage from each of the photocells follows the circuit through amplifiers 34 and 42, respectively. Each amplifier 34 and 42 applies a voltage to the grid it regulates, 36 and 44, respectively. Each grid provides, in effect, a sensitive valve controlling the current through the tube of which it is a part. If these applied voltages are unequal electrical unbalance is created, that is, the plates of the two triodes assume different potentials whereby current flows between them and follows a path through one of the relay coils. The arrangement of the circuit is such that the relay to be energized supplies power to start the reversing motor 66 in such a direction that the unbalance will be reduced through the action of the correction potentiometer 32. Motor 66 will continue to run until the unbalance is eliminated; at this time neither relay will be energized. Calibrating potentiometer 30 is then adjusted by the operator until recorder pen 78 lies on the standard or 100% line on the chart 50, this position representing the thickness of the calibrating sheet.

Sheet 10 is driven in direction past measuring apparatus 14 to carry consecutive areas of the sheet between apertures 20 and 21. The amount of light energy reaching comparison photocell 24 is directly proportionate to the intensity of the lamp and is constant during the testing operation provided that the intensity of the light source itself is constant. The amount of light energy reaching measuring photocell 26 is also directly proportionate to the intensity of the lamp but inversely proportionate to the opacity of the material interposed between the apertures 20 and 30. It is evident that any variation in light intensity in the lamp 16 is compensated in the circuit by the inclusion of the comparison photocell 24 whose photoelectrical effects oppose those of the measuring photocell 26. Any increase or decrease in the thickness of a section over that of the calibrating sheet thickness changes the quantity of light transmitted through the sheet to the measuring photocell 26 and hence, sets up voltage differentials across the balancing circuit, thus creating unbalance in the circuit. The circuit responds to re-establish balance by automatic adjustment of the potentiometer slider whereby the recorder pen simultaneously deflects.

By way of example, an increase in measuring photocell output resulting from a decrease in paper thickness increases the voltage applied to the grid of triode 38 thereby increasing the current passing through that tube, decreasing the potential of the plate 48 and increasing the potential of cathode 52. Since the cathodes of the two triode tubes 38 and 46 have a common connection, the potential of cathode 54 of tube 46 increases, current through this tube decreases and the potential of plate 50 increases. Since plate 50 is at a higher potential than plate 48, current passes through diode 60 and closes relay contact 62, thus energizing motor 66. As previously mentioned, the relay contacts are so connected to the motor 66 that the motor runs in that direction which reduces the voltage differential across the balancing circuit by adjustment of the potentiometer slider 72 which is connected to the drive of motor 66 by gearing, as described.

In operation, the position of potentiometer slider 72 is adjusted to vary the resistance across resistor 84 to give constant output voltage, $V_2$, despite variations in input voltage $V_1$, (see Fig. 3). It can be shown mathematically that changes in value of the variable resistor 84 during any interval bears a linear relationship to changes in the input voltage $V_1$ during that interval. Furthermore, since the arrangement of the apparatus is such that the variations in input voltage $V_1$ are substantially a direct function of variations in measuring photocell output due to changes in paper thickness only, it is evident that the deflection of the recorder pen 78 bears a linear relationship to changes in input voltage $V_1$ and consequently to changes in the thickness of sheet 10.

The invention is not to be understood to be restricted to the details set forth since these may be modified within the scope of the appended claims without departing from the spirit and scope of the invention. For example, the invention is not restricted to the method and apparatus in which the sheet is mounted for continual travel. It is fully within the scope of the invention to mount the optical system for movement lengthwise, transversely or at random, to scan successive portions of a stationary sheet. In still another embodiment of the invention, relative changes in thickness of successive portions across the length of the sheet may be made simultaneously with measurements of transverse thickness changes by operating two optical systems and attendant circuits simultaneously. This may be conveniently done by moving the sheet through one optical system to measure lengthwise variations in thickness and simultaneously scanning transverse areas with another optical system suitably mounted for movement.

The measuring device may suitably be used as a manufacturing control during the formation of paper sheet material by incorporating the device as an integral part of the paper manufacturing machine. When so used the apparatus makes a continuous record of the paper thickness as it is being manufactured.

Furthermore, the optical system illustrated and described is subject to many variations. It is not necessary that the light source be between the photocells, as illustrated. Any suitable means for illuminating the photocells from the same source wherein the light reaching the comparison photocell is directly proportionate to the source of light intensity and light reaching the measuring photocell is directly proportionate to the source intensity and inversely proportionate to thickness or opacity of material measured is encompassed by the invention. For example, the photocells may be mounted at right, or any suitable angles to each other, and the bulb may be erect and shielded on one side. With such arrangements a reflective surface included in the optical system is positioned to transmit light to the comparison photocell through an aperture in the reflective surface and to transmit reflected light through the material measured to the measuring photocell.

A circuit might be employed in which the voltage differential produced by a change in thickness of the material being examined is converted into an alternating current voltage by any conventional means, such as a D. C.-A. C. chopper, amplified if necessary and applied to a reversible servomotor which in turn adjusts the position of the correction potentiometer slider and recording pen.

What I claim is:

1. The method of continuously recording changes in thickness of successive areas of translucent, homogeneous material which comprises continuously transmitting visible light through successive areas of said material, energizing a photosensitive cell with said transmitted light, simultaneously energizing another photosensitive cell with light from the same light source, comparing the D. C. voltage outputs of said photosensitive cells, balancing said compared D. C. voltages by adjusting the output of the first of said photosensitive cells and recording said adjustment as a measure of the sheet thickness.

2. The method of continuously recording changes in thickness of successive areas of translucent, homogeneous material which comprises continuously moving a sheet of said material relative to a source of visible light and a photosensitive cell, transmitting light from said source through said material to said photosensitive cell to energize the same, simultaneously energizing another photosensitive cell with light from the same light source, comparing the D. C. voltage outputs of said photosensitive cells, balancing said compared D. C. voltages by adjusting the output of the first of said photosensitive cells and recording said adjustment as a measure of the sheet thickness.

3. A sheet thickness recording mechanism which comprises a sheet of homogeneous, translucent material, two photocells, a source of visible light, means moving said material relative to one of said photocells, referred to as the measuring photocell, and said light source so that light from said light source is transmitted through successive areas of said sheet to said measuring photocell, means positioning said other photocell for transmission of light thereto from said light source, D. C. voltage amplifying means for each photocell, means for comparing and equalizing said amplified D. C. voltages including a correction potentiometer interposed between the measuring photocell and the amplifier for the measuring photocell, two series circuits each comprising a relay and a uni-directional electrical element connected in opposing polarity between the two D. C. voltage amplifying means with the D. C.

voltage outputs of said amplifying means opposing each other, a slider for said correction potentiometer, a reversible motor, a motor operating circuit, means connecting said motor and slider for movement of said slider upon operation of said motor, recorder means operatively connected to said motor for recording the operation of said motor and movement of the slider, and switches in said motor operating circuit controlled by said relays for energizing the motor operating circuit.

PETE E. MARENHOLTZ.

REFERENCES CITED

The following references are of record in the file of this patent:

UNITED STATES PATENTS

| Number | Name | Date |
|---|---|---|
| 1,806,197 | Hardy et al. | May 19, 1931 |
| 2,367,614 | Rich | Jan. 16, 1945 |
| 2,388,105 | Wilson | Oct. 30, 1945 |
| 2,397,038 | Obeshain et al. | Mar. 19, 1946 |